United States Patent
Janko et al.

(10) Patent No.: US 6,690,840 B1
(45) Date of Patent: Feb. 10, 2004

(54) IMAGE ALIGNMENT WITH GLOBAL TRANSLATION AND LINEAR STRETCH

(75) Inventors: Bozidar Janko, Portland, OR (US); Shane Ching-Feng Hu, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 09/499,886

(22) Filed: Feb. 8, 2000

(51) Int. Cl.$^7$ ................................................. G06K 9/32
(52) U.S. Cl. ...................................... 382/294; 382/300
(58) Field of Search ................................. 382/106, 131, 382/154, 173, 205, 206, 209, 218, 219, 220, 256, 274, 276, 278, 284, 294, 295, 298, 300; 358/525, 528; 345/610, 648, 649, 672, 660; 348/95, 155, 580

(56) References Cited

U.S. PATENT DOCUMENTS

| | | | |
|---|---|---|---|
| 4,467,349 A | * 8/1984 | Maloomian | 348/77 |
| 4,672,676 A | 6/1987 | Linger | |
| 5,020,116 A | 5/1991 | Macaulay | |
| 5,023,815 A | 6/1991 | Wilson et al. | |
| 5,054,097 A | 10/1991 | Flinois et al. | |
| 5,164,997 A | 11/1992 | Kumagai | |
| 5,215,095 A | 6/1993 | Macvicar et al. | |
| 5,295,200 A | 3/1994 | Boyer | |
| 5,453,840 A | * 9/1995 | Parker et al. | 356/400 |
| 5,581,638 A | * 12/1996 | Givens et al. | 382/294 |
| 5,623,560 A | 4/1997 | Ezuka et al. | |
| 5,633,951 A | 5/1997 | Moshfeghi | |
| 5,690,106 A | * 11/1997 | Bani-Hashemi et al. | 600/425 |
| 5,694,481 A | 12/1997 | Lam et al. | |
| 5,850,486 A | 12/1998 | Maas, III et al. | |
| 5,963,664 A | * 10/1999 | Kumar et al. | 382/154 |
| 6,067,373 A | * 5/2000 | Ishida et al. | 382/130 |
| 6,078,701 A | * 6/2000 | Hsu et al. | 382/294 |
| 6,111,984 A | * 8/2000 | Fukasawa | 382/209 |
| 6,266,453 B1 | * 7/2001 | Hibbard et al. | 382/294 |
| 6,285,711 B1 | * 9/2001 | Ratakonda et al. | 375/240.16 |
| 6,459,822 B1 | * 10/2002 | Hathaway et al. | 382/296 |

OTHER PUBLICATIONS

"A Linear Array Parallel Image Processor: SliM–II", Hyunman Chang, Soohwan Ong and Myung H. Sunwoo, 1063–6862/97 1997 IEEE, pp. 34–40.

"Automated Submicrometer Defect Detection During VLSI Circuit Production", John R. Dralla, John C. Hoff and Andrew H. Lee, SPIE vol. 775 Integrated Circuit Metrology, Inspection, and Process Control (1987), pp. 218–225.

"Lanelok: An Algorithm for Extending the Lane Sensing Operating Range to 100 Feet", Surender K. Kenue, SPIE vol. 1388 Mobile Robots V (1990), pp. 222–233.

"A Position Recognition Algorithm for Semiconductor Alignment Based on Structural Pattern Matching", Hiroshi Sakou, Takafumi Miyatake, Seiji Kashioka and Masakazu Ejiri, IEEE Transactions Dec. 1989, vol. 37, No. 12 (ISSN 0096–3518), p. 2148–2157.

"Measurement and MV: Improving Wafer Alignment", Kathy McWalter, Photonics Spectra, Designer's Handbook, Jan. 1989, pp. 77–78, 80.

* cited by examiner

*Primary Examiner*—Bhavesh M. Mehta
*Assistant Examiner*—Kanji Patel
(74) *Attorney, Agent, or Firm*—Francis I. Gray

(57) ABSTRACT

A technique for image alignment with global translation and linear stretch determines translation parameters for three corresponding linearly displaced blocks in a reference image and a corresponding distorted test image. From the differences between the translation parameters for the three blocks the presence of stretch is detected and, if detected, a stretch factor is estimated. The estimated stretch factor is used as a starting point to stretch the reference image to overlap the distorted test image as a refinement process. The resulting refined stretch factor is then used in a reverse stretch process to shrink the distorted test image, and the distorted test image is then aligned with the reference image to obtain picture quality metrics.

4 Claims, 3 Drawing Sheets

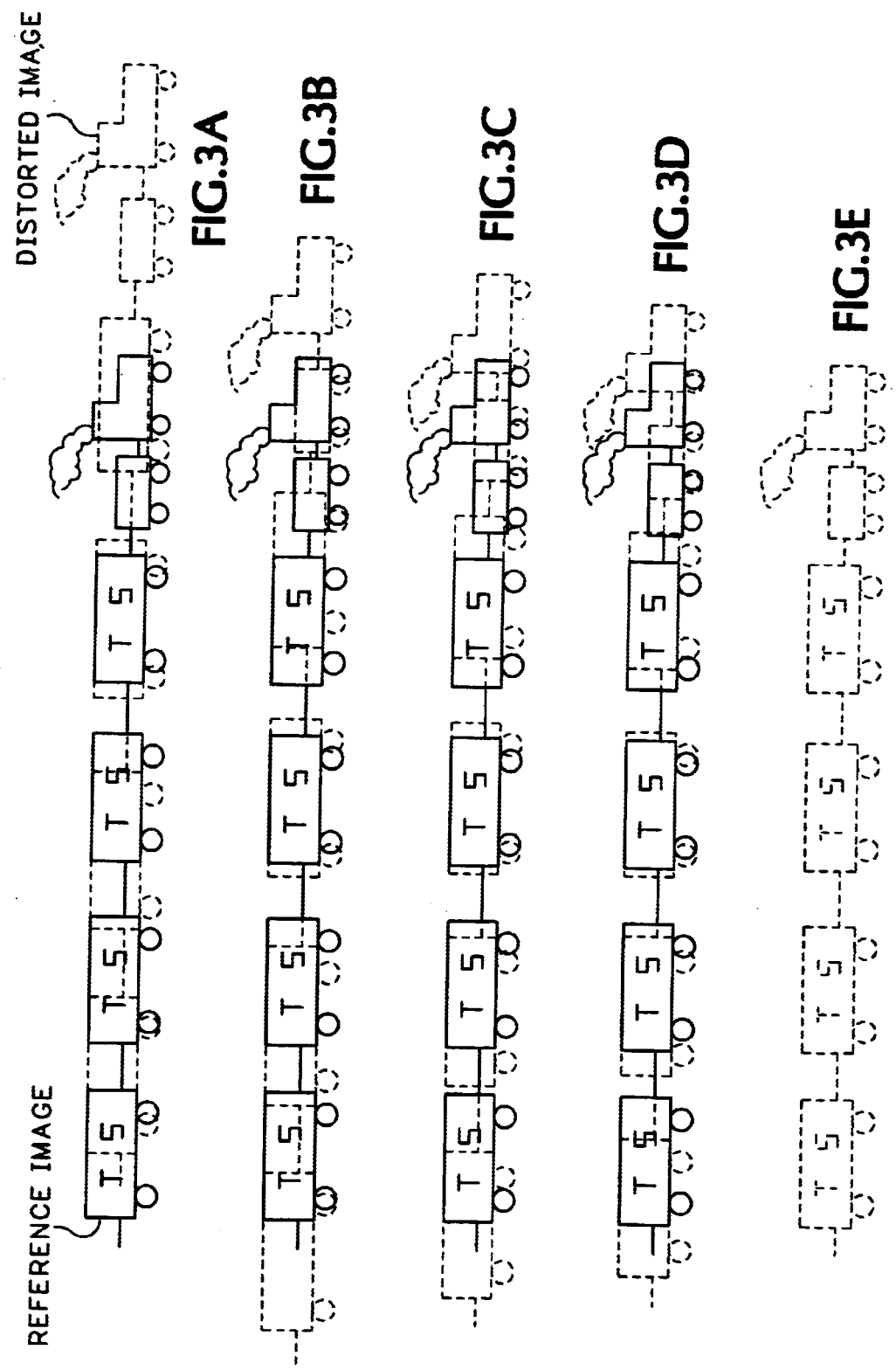

IMAGE ALIGNMENT WITH GLOBAL TRANSLATION AND LINEAR STRETCH

BACKGROUND OF THE INVENTION

The present invention relates to image alignment, and more particularly to image alignment with global translation and linear stretch which is detected and corrected.

Accurate spatial alignment of digital images is of fundamental importance to many applications. "Computer Image Processing and Recognition" by Ernest Hall, Academic Press 1979, pp. 480–484, describes a basic correlation method for template matching which may be used for image alignment. "The Phase Correlation Image Alignment Method" by C. D. Kuglin et al, Proceedings of the IEEE 1975 Internal Conference on Cybernetics and Society, September 1975, pp. 163–165, describes a variant of the basic correlator that uses phase information. These methods are appropriate for global translation, such as shown in FIGS. 1A and 1B, and can be very accurate. However for digital images that also are distorted with a linear stretch, as shown in FIGS. 2A and 2B, these correlation methods alone are not capable of handling such a complex model.

A more general approach is taken by James R. Muller et al., "Adaptive-Complexity Registration of Images", Technical Report 941, University of Rochester, May 1994. The model complexity for local regions may be adaptively expanded to include global translation as well as higher order models, such as linear (affine) to quadratic. However the sizes of the subregions must be substantial to avoid aliasing problems so that, when stitched together, the boundaries between subregions usually pose a problem. In addition there is no global stretch parameter derived.

What is desired is an image alignment method that compensates both for global translation and linear stretch.

BRIEF SUMMARY OF THE INVENTION

Accordingly the present invention provides an image alignment method that compensates for global translation and linear stretch. Using left, center and right correlation blocks, translation parameters are determined between a reference image and a corresponding distorted test image. Based upon the differences between the translation parameters for the blocks, linear stretch is detected and a rough estimate of a stretch factor is determined. The estimated stretch factor is fine tuned by centering the reference image relative to the distorted test image and then stretching the reference image linearly using a linear interpolation operation starting with the estimated stretch factor until the two images overlap as closely as possible, the final stretch factor being that which results in the closest overlap. Then the distorted test image is unshrunk using the refined stretch factor and translated so that the distorted test image is aligned with the reference image for picture quality analysis, for example.

The objects, advantages and other novel features of the present invention are apparent from the following detailed description when read in conjunction with the appended claims and attached drawing.

BRIEF DESCRIPTION OF THE SEVERAL VIEWS OF THE DRAWING

FIGS. 3A–E are illustrations of determining a stretch factor for an image that is translated and stretched according to the present invention.

DETAILED DESCRIPTION OF THE INVENTION

The basic structure of the present invention augments the basic block correlation methods described by Hall and Kuglin et al above to detect the potential presence of linear stretch between a reference image and a corresponding distorted test image. Once detected, a linear interpolation operator is applied to search for a stretch factor between the images. After the stretch factor is found, the linear interpolation operator performs the inverse (shrink) operation on the distorted test image. A detailed description of the method for detecting and correcting one dimensional (horizontal) stretch and global translation follows, which may be expanded to handle two dimensional stretch as well.

Figure 1A:
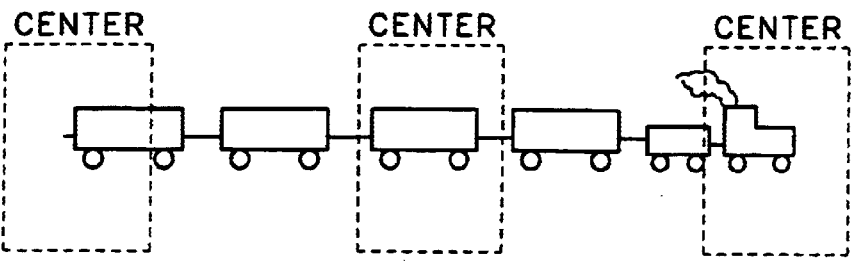
FIGS. 1A and 1B are illustrations of an image that is translated only.
Figure 1B:
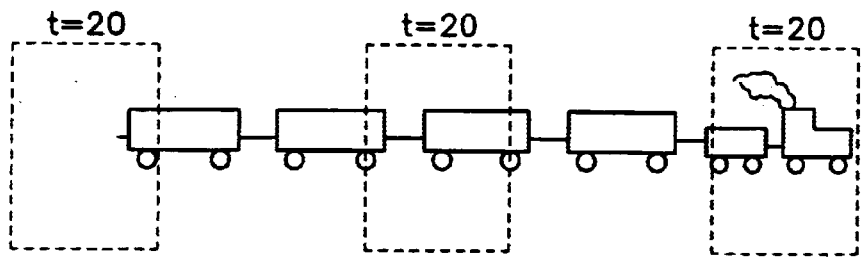
Figure 2A:
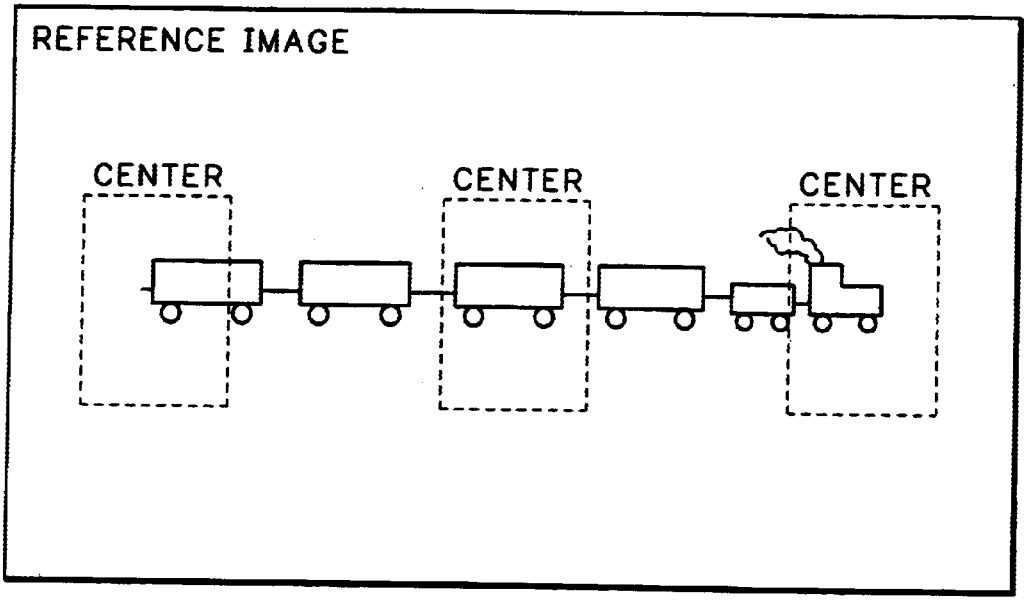
FIGS. 2A and 2B are illustrations of an image that is translated and stretched.
Figure 2B:
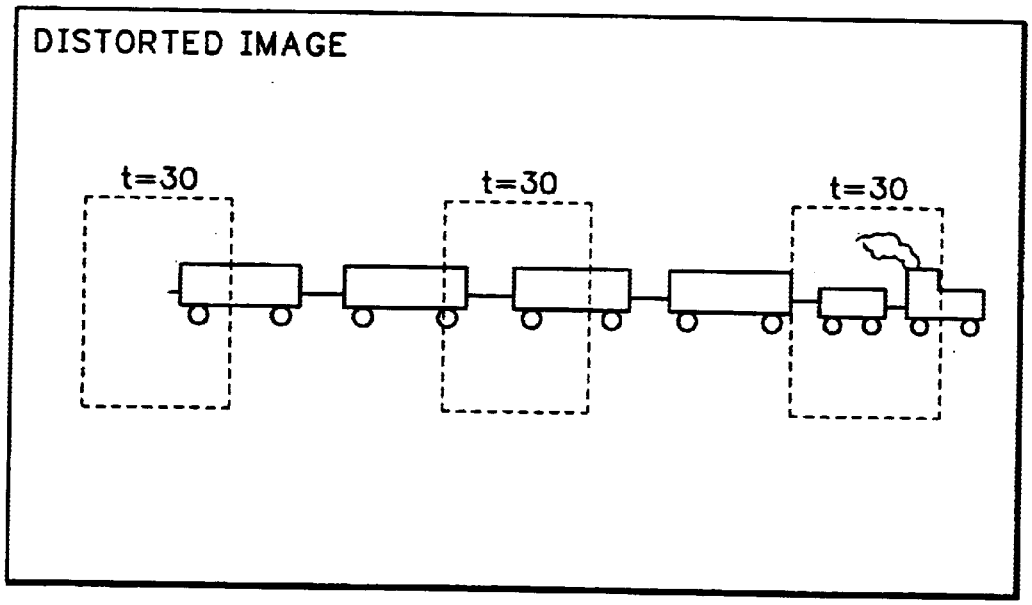

First, three correlation blocks or subregions are located in center, left and right positions of a digital image, and spatial registrations are performed within each block to determine translation parameters, as shown in FIGS. 1A, 1B, 2A and 2B. Details may be found in U.S. Pat. Ser. No. 6,483,538 "High Precision Sub-Pixel Spatial Alignment of Digital Images".

Second, if the translation parameters ($\Delta X_{13}$ L, $\Delta X\_C$, $\Delta X\_R$) found in the first step are nearly identical for the left, center and right blocks, then there is no stretch. Otherwise, if compared with the translation parameters of the center block, the left block translates more toward the left direction and the right block translates more toward the right direction, then a linear expansion stretch is detected. In a similar fashion linear shrinkage is detected if the left block translates more towards the right and the right block translates more towards the left with respect to the center block.

In the next step, the differences in the translation parameters with respect to the center block provides a rough estimate of the range of the stretch (shrinkage) factor. Let ($X\_L, Y\_L$), ($X\_R, Y\_R$) denote the center coordinates of the left and right blocks. For horizontal stretch let $\Delta Xl$ and $\Delta Xr$ denote the difference of the translation parameters with respect to the center block, i.e., the amount of stretch in the left and right blocks relative to the center block where $\Delta Xl = \Delta X\_C - \Delta X\_L$ and $\Delta Xr = \Delta X\_R - \Delta X\_C$. Then Range$\_L = (\Delta Xl/(W2 - X\_L))*K$;

Range$\_R = (\Delta Xr/(X\_R - W2))*K$;

Range$= ($Range$_{\_L} + $Range$_{\_R})/2$ where W2 is the value of one-half the width of the image, K is a constant, (W2−X_L) is the distance between the left block and the center of the image, and (X_R−W2) is the distance between the center of the image and the right block. This provides a rough approximation of the shrink factor. However, due to the sensitivity of the alignment between the reference image and the distorted image in order to obtain accurate picture quality metrics, for example, further tuning of the shrink factor is necessary, as illustrated in FIGS. 3A, 3B, 3C and 3D.

Fourth, an exhaustive search is done using a linear interpolative operation to fine tune the stretch (shrinkage) factor. A linear stretch (shrinkage) operation of the reference image over the range (1.0 to Range estimated above) with the step size desired is performed and the result is matched against the distorted test image. The linear stretch (shrinkage) may be done by any method well known in the art, such as that described in "Software Pixel Interpolation for Digital Still Cameras Suitable for a 32-Bit MCU" by T. Sakamoto et al, IEEE Transactions on Consumer Electronics, Vol. 44, No. 4, November 1998. The search to find the stretch (shrinkage) factor is iterative until a minimum error is achieved. A typical error measure is the mean squared difference between the reference and distorted test images.

Finally after the stretch factor is found, an inverse stretch operation is performed on the distorted test image using the linear interpolation operation and the distorted test image is translated to be essentially in alignment with the reference image. The resulting corrected distorted test image may now be compared with the reference image to obtain accurate picture quality metrics, for example.

Thus the present invention provides a technique for image alignment with global translation and linear stretch correction of a distorted image by obtaining translation parameters for left, center and right correlation blocks of the distorted image relative to a corresponding reference image, determining from the translation parameters and a linear interpolation operation what the stretch factor is between the images, and then reverse stretching using the stretch factor and the linear interpolation operation and translating the corrected distorted image to be aligned with the reference image to obtain picture quality metrics.

What is claimed is:

1. A method of detecting and correcting global translation and stretch between a two-dimensional reference image and a corresponding distorted two-dimensional test image comprising the steps of:

detecting whether stretch is present between the reference image and the test image using block correlation methods;

when stretch is detected, searching for a stretch factor between the images using a linear interpolation operator; and performing an inverse stretch operation on the test image using the linear interpolation operator and the stretch factor to align the test image with the reference image.

2. The method as recited in claim 1 wherein the detecting step comprises the steps of:

for at least three corresponding blocks in the images performing spatial registration to obtain respective translation parameters; and comparing the respective translation parameters for the blocks to detect stretch between the images when the respective translation parameters are not nearly identical.

3. The method as recited in claim 2 wherein the spatial registration performing step comprises the steps of:

defining left, right and center blocks for the images; and performing the spatial registrations for each of the blocks to obtain the respective translation parameters.

4. The method as recited in claim 2 wherein the searching step comprises the steps of:

obtaining the differences between the respective translation parameters of the blocks relative to a central one of the blocks;

from the differences obtain an estimate for the shrink factor; and iteratively searching for the shrink factor based upon the estimate using the interpolation operation until a minimum error measure is attained, the shrink factor occurring at the minimum error measure.

* * * * *